Oct. 22, 1940.                W. G. BURKHART                 2,218,697
                       ELECTRIC MEASURING APPARATUS
                        Filed July 7, 1937      4 Sheets-Sheet 4
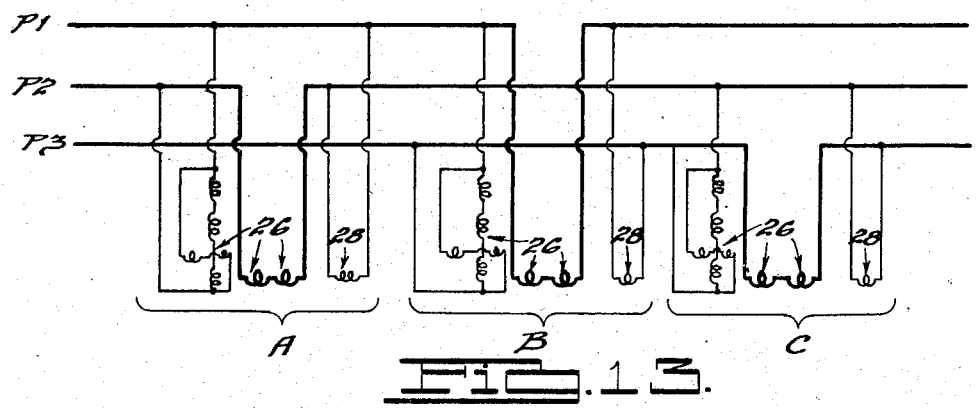
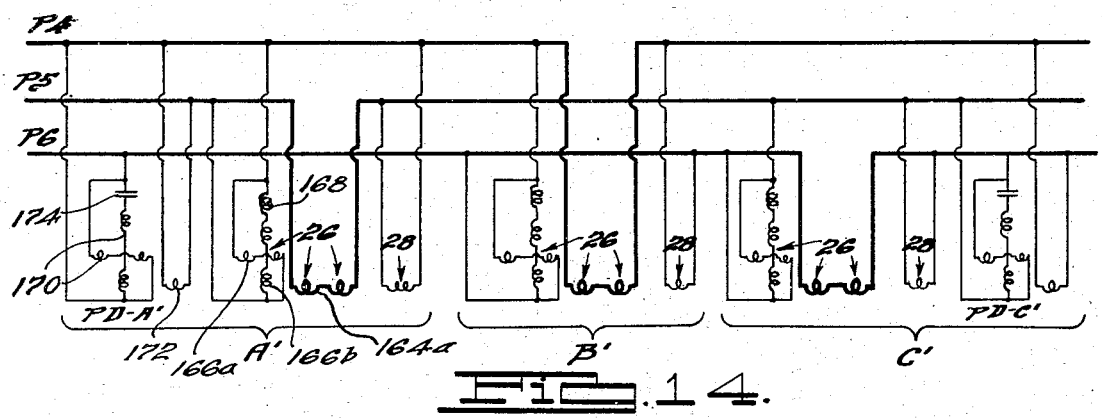
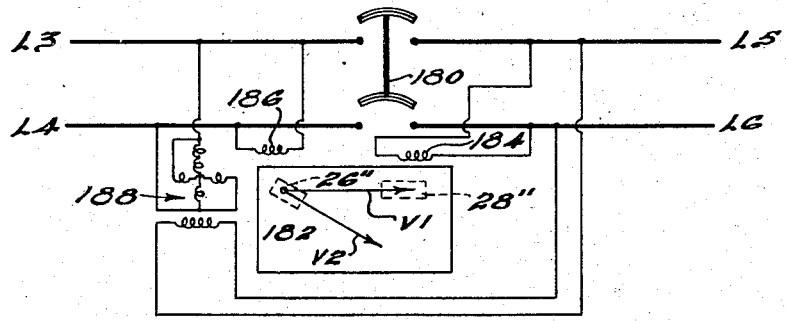
INVENTOR
*William G. Burkhart.*
BY
*Harness, Dickey & Pierce.*
ATTORNEYS.

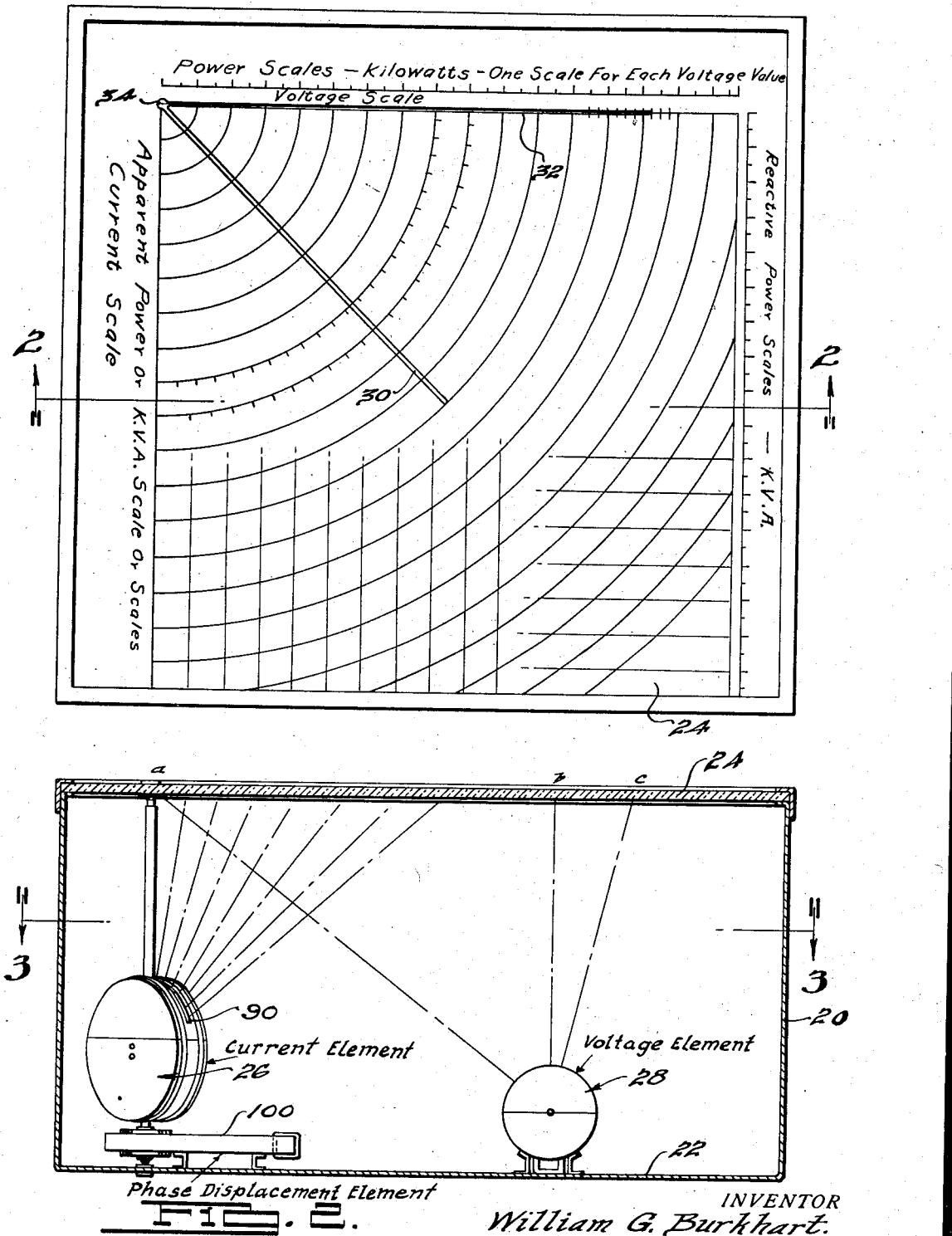

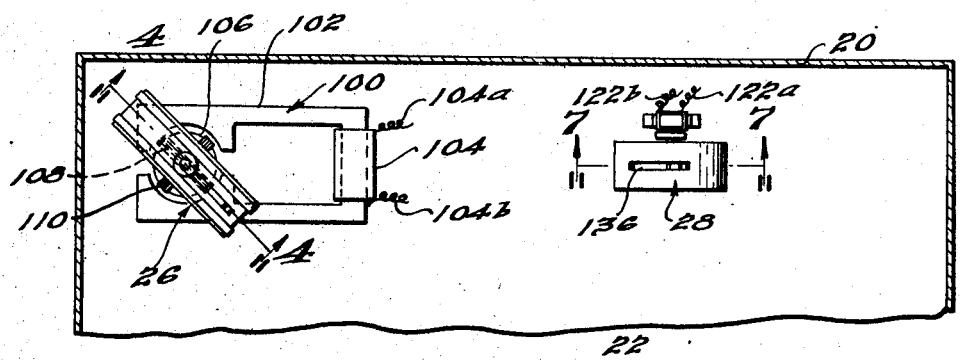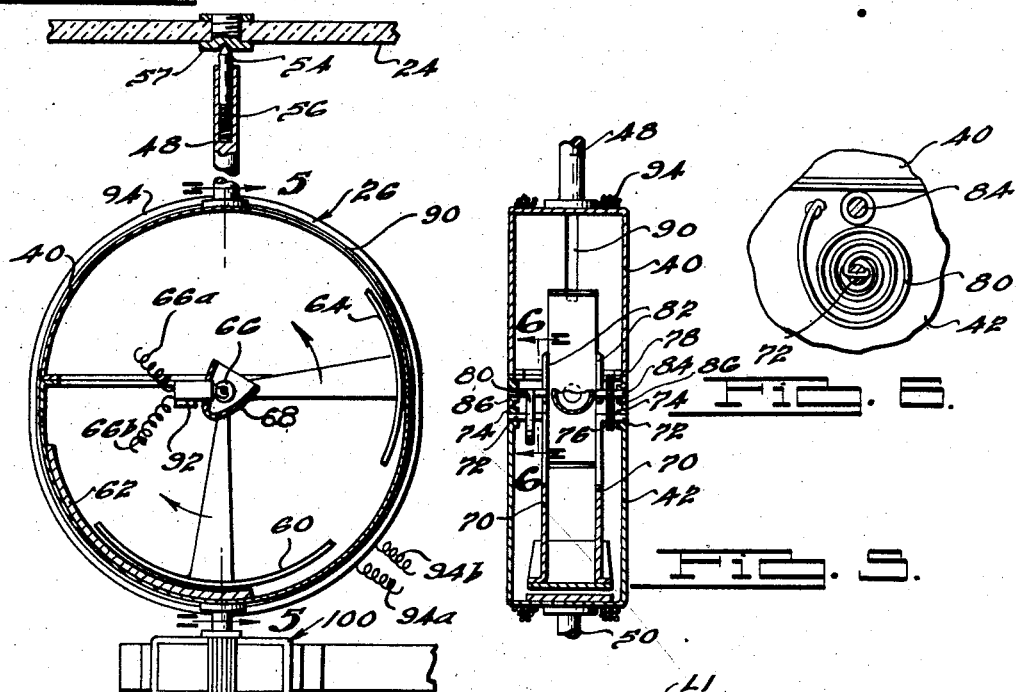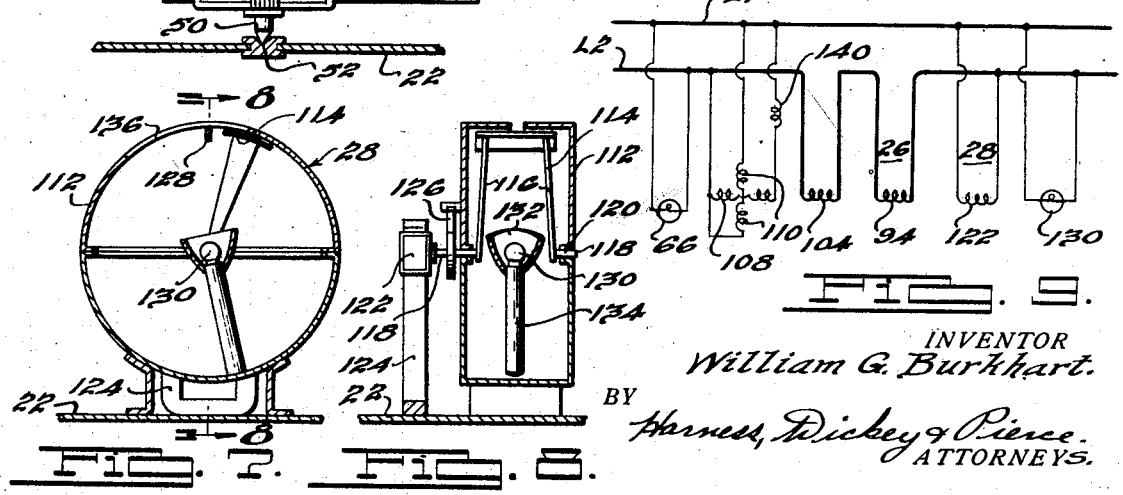

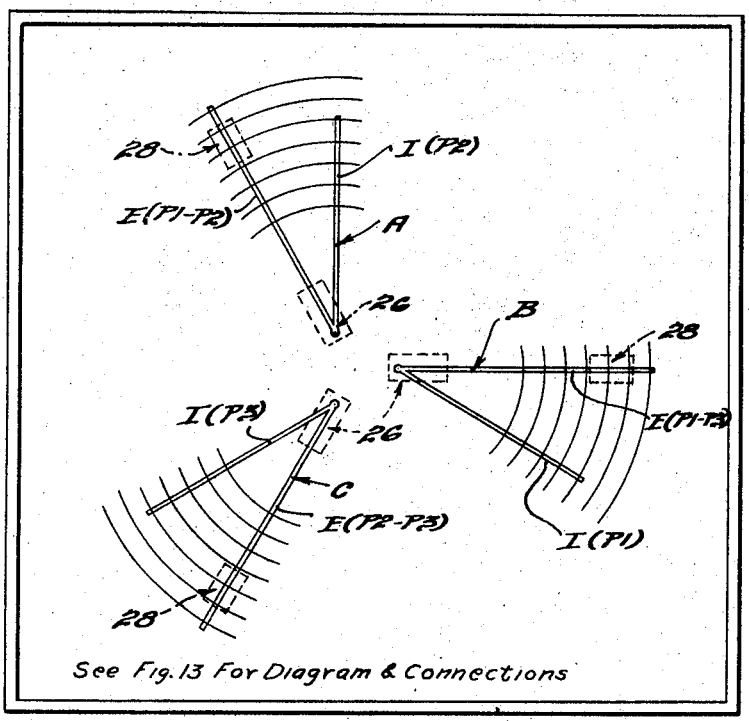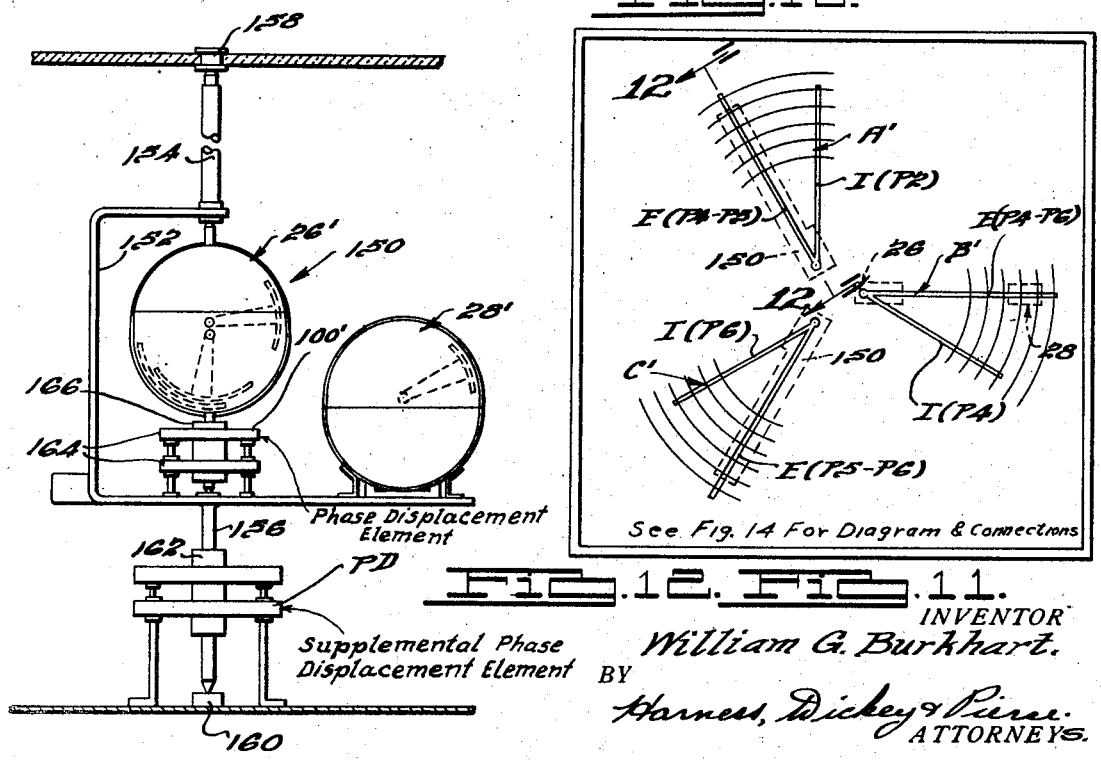

Patented Oct. 22, 1940

2,218,697

UNITED STATES PATENT OFFICE 2,218,697

ELECTRIC MEASURING APPARATUS

William G. Burkhart, Detroit, Mich.

Application July 7, 1937, Serial No. 152,444

9 Claims. (Cl. 172—245)

The present invention relates to electrical measuring and indicating devices, and in particular is directed to the provision of such a device constructed and arranged to measure and indicate, in animated vector diagram form, one or more electrical quantities such as current, voltage, power factor, reactive factor, true power, reactive power and apparent power.

Objects of the present invention are to provide a device of the above generally indicated character, of simple and compact form, which may be economically manufactured and assembled, and which is accurate and reliable in operation; to provide such a device which is applicable to either single or poly-phase systems of either fixed or variable voltages, as well as to poly-phase systems of either symmetrical, unsymmetrical balanced or unbalanced characteristics; and to provide such a device which may be utilized to measure one or more of the above indicated quantities occurring in one single or poly-phase system, or to measure and compare such quantities occurring in two or more separate single or poly-phase systems.

Further objects of the present invention are to provide a device of the above generally indicated character in which the several vector quantities to be measured and indicated are represented by light beams projected on a glass surface; to provide such a device including means to alter the length of the light beams in order to indicate variations in the magnitude of the electrical quantities; to provide such a device in which the vectors corresponding to several different electrical quantities are referred to a common origin; and to provide such a device embodying means to shift one or all of the vectors in space, in accordance with changes in the phase relations between the associated electrical quantities, so that the angle between any two vectors indicates the phase difference between the associated quantities.

Further objeects of the invention are to provide improved and simplified control and operating mechanisms for effecting the projection of the light beams, for changing the effective lengths thereof, and for controlling the shifting of the phase angles between the beams.

With the above, and other, as well as more detailed objects, in view, which appear in the following description and in the appended claims, preferred but illustrative embodiments of the invention are shown in the accompanying drawings, throughout the several views of which corresponding reference characters are used to designate corresponding parts and in which:

Figure 1 is a top plan view of the device as a whole;

Fig. 2 is a view in transverse vertical section, taken along the line 2—2 of Fig. 1, and showing the voltage and current indicating element in elevation;

Fig. 3 is a sectional plan view, taken along the line 3—3 of Fig. 2;

Fig. 4 is a detail sectional view of the current indicating and beam projecting mechanism;

Fig. 5 is a view in vertical section, taken along the line 5—5 of Fig. 4;

Fig. 6 is a broken sectional view in elevation of a spring element associated with the current indicating element, taken along the line 6—6 of Fig. 5;

Fig. 7 is a view in vertical section of the voltage indicating element;

Fig. 8 is a view in section, taken along the line 8—8 of Fig. 7;

Fig. 9 is a diagrammatic view of circuit connections which may be used in the operation of the device of Figs. 1 through 8;

Fig. 10 is a top plan view of a modified embodiment of the invention;

Fig. 11 is a top plan view of a further modification;

Fig. 12 is a fragmentary detailed sectional view, taken along the line 12—12 of Fig. 11;

Figs. 13 and 14 are diagrammatic views of circuit connections which may be used in operating the devices of Figs. 10 and 11, respectively; and, Fig. 15 is a diagrammatic view of circuit connections which may be used in operating the device as a synchroscope or the like associated with two different circuits.

Before proceeding with a detailed description of the device, it is noted that in its preferred and illustrated form, the device comprises generally a box-like enclosure, adapted to house a plurality of light beam projectors and their operating mechanisms, corresponding in number to the number of vectors which it is desired to project. The light beams, which are cast through slotted openings in the projectors, are preferably but not necessarily so positioned as to cast the beams upon the bottom surface of a horizontally disposed glass panel, which forms the top panel of the device. The beams appear as lines when viewed from above the glass panel. The length of these lines or vectors is preferably controlled by providing the operating mechanism with shields, which are movable in response to electrical conditions to lengthen or shorten the slot through which the associated beam is projected. The angle of one of the lines or vectors relative to the other, is preferably modified by bodily shifting the operating mechanism for the associated beam or line. The top panel is suitably scaled and graduated, with reference to the vectors cast thereon, so that the device indicates current, voltage, power factor, reactive factor, true power, reactive power, and apparent power in a single system or in a plurality of associated systems.

In its most simple form, the device is particularly adapted for use in either single phase systems or balanced poly-phase systems, so that a single voltage vector and a single current vector may be utilized as a measure of the several desired quantities. In such instance, the voltage vector is arranged to be fixed in space and the current vector is arranged to be angularly shiftable in space, and also variable in magnitude. Where the voltage of the system is expected to remain uniform within the limits of readability of the device, it is found to be satisfactory to replace the projected voltage beam by a line scribed or otherwise impressed upon the surface of the glass panel and which is, therefore, fixed both in space and in magnitude. In other instances, it is found preferable to utilize a voltage beam, which, while fixed in space, is variable in magnitude and so is effective to measure changes in the voltage of the system.

In a modified form, the device is provided with a plurality of voltage projecting mechanisms and a corresponding plurality of current projecting mechanisms, so that the voltage and current conditions in the separate phases of a three, or other poly-phase, system may be separately indicated and measured. In certain instances, as where the voltages of the system are symmetrical, it has been found satisfactory to arrange the voltage beams so as to be fixed in space and variable in magnitude, while the associated current projecting beams are variable both in magnitude and in space relative to the associated voltage beams. In unsymmetrical systems, it is found desirable to make one of the voltage beams fixed in space, and to arrange the other voltage beams so as to be variable in space with respect to the fixed voltage beam. In such latter system, the loads are unbalanced, and, accordingly the several current vectors are made variable both in space and in magnitude.

Referring first to Figs. 1, 2 and 3, the device comprises a rectangular box-like structure, having the enclosing side and bottom walls 20 and 22, respectively, and the enclosing upper wall 24, formed as a glass panel. The enclosure houses a current vector projecting element 26, and a voltage vector projecting element 28, which are suitably supported upon the bottom of the device and project light beams upwardly against the under-side of the panel 24, which light beams are visible from above the panel as vectors 30 and 32, both of which are referred to a common origin 34. The glass panel is suitably scaled and graduated to read the desired electrical quantities. For example, the top of the panel, as viewed in Fig. 1, may be provided with one or more power scales, adapted to read the true power of the system in kilowatts. In the event the voltage is of a fixed value, one such power scale is sufficient, and may be calibrated to read the product of the fixed voltage and the power component of the variable current. In the event the voltage is variable between predetermined limits, a plurality of scales may be utilized, one scale being provided for each selected value of voltage within the variable limits. As is also indicated by the legends, the top side of the panel may be, as viewed in Fig. 1, calibrated to indicate voltage values. The right-hand side of the panel, as viewed in Fig. 1, is illustrated as being provided with a reactive power scale or scales, one scale being sufficient in the event the voltage is expected to remain substantially uniform, and a plurality of reactive power scales being utilized in the event of a variable voltage. The left-hand side of the panel, as view in Fig. 1, is calibrated to read the apparent power or the product of voltage and current in the system, as well as to show actual current values. The power factor of the system is readily readable, as is evident from Fig. 1, as being the cosine of angular difference between the voltage vector 32 and the current vector 30; and the reactive factor appears as the sine of this angle. The just described scale is suited for use in systems in which the current lags behind the voltage, but if desired, a scale may be used which is graduated for both leading and lagging relations.

Referring more particularly to Figs. 4, 5 and 6, the current vector projecting mechanism 26 comprises two substantially semi-circular members 40 and 42 having laterally spaced flat heads, and adapted to be fitted together along their flat sides, to form a generally cylindrical enclosure split along a line slightly spaced from the diameter. The casing formed by the members 40 and 42 is supported for bodily rotation about a vertical axis, by a shaft 48 secured to the top of the member 40, and a companion shaft member 50 secured to the under-side of the lower member 42. The shaft 50 is provided with a pointed end, which is received in a jeweled or other conventional sensitive bearing 52, secured in the bottom wall 22 of the casing for the device. The upper shaft 48, is provided with a pointed bearing member 54, which is received in a corresponding jeweled bearing element 57, suitably secured to the glass panel 24. A back-up spring 56 is seated between the bearing member 54 and the shaft 48, and acts to maintain a suitable and uniform pressure between the bearings.

The housing members 40 and 42 house a suitable ammeter element, comprising the movable iron vane 60, and a stationary iron vane 62; an opaque shield 64 which is mechanically connected to the movable vane 60, and a lamp 66, provided with a suitable reflector 68. The stationary iron vane 62 is suitably and permanently secured to the inner face of the casing member 42. The movable iron vane 60 is provided with spaced legs 70, the inner ends of which are outwardly turned to form trunnions 72, which are rotatably received in bearing bosses 74 provided therefor in the casing member 42 adjacent the flat side thereof. One of the trunnions 72 is provided with a pinion 76 for cooperation with an associated larger pinion 78 associated with the shield 64, and so forms a driving connection between the shield 64 and the movable vane 60. The other trunnion 72 is provided with a coil spring 80, the otherwise free end of which is secured to the casing member 42. The spring 80 thus urges the movable vane 60 in a clockwise direction, as viewed in Fig. 4, to a position corresponding to a zero or minimum current reading.

The shield 64 comprises a generally arcuately formed body of opaque material, and is provided with the laterally spaced legs 82, which extend radially inwardly of the casing, and are provided with outwardly turned ends 84, which form trunnions which are rotatably received in bearing bosses 86 formed in the casing member 42. The shield 64 is positioned in registry with a light projecting slot 90 formed in the periphery of the casing member 40, and it will be observed that the angular movements of the shield 64 through the influence of the vane 60, serve to enlarge or reduce the effective length of the slot 90 and to consequently lengthen or shorten the beam which is projected therethrough onto the under side of the glass panel 24.

The light 66 and its reflector 68 are supported within the casing member 42 on a member 92, which extends between the two opposite side walls of the casing member 42. The reflector 68 is so positioned and formed that the beam cast by the light 66 is effective to embrace the entire length of the slot 90. It will be noted that the shaft 48 and its associated parts are of relatively small size, and thus enable one end of the beam projected through the slot 90 to fall very closely adjacent the axis of rotation of the light projecting mechanism. The light 66 is provided with flexible terminals 66a, 66b, by which it may be connected to a suitable external source of supply, as described below with reference to Fig. 9.

It will be appreciated that the angle of incidence between the righthand marginal edge of the beam projected from the current projector 26, as viewed in Fig. 2, varies in accordance with the movement of the shield 64, so that, in the absence of compensation, equal increments of angular movement of the shield 64 in a current increasing direction would be accompanied by progressively increasing increments of the length of the current vector 30. In the present instance, this compensation is preferably introduced by suitably forming the vanes 60 and 62 of the current projector 26 so as to introduce a progressively increasing air gap between the element 60 and the stationary vane 62, as the vane 60 moves in a current increasing or counter-clockwise direction, as viewed in Fig. 4. By suitably proportioning the parts in this way, it is found that equal increments of increasing current produce progressively decreasing increments of angular movement of the shield 64, which in turn produce substantially uniform increments of increasing length of the vector 30.

In the illustrated embodiment, the current winding 94 for the current projector 26 is wound circumferentially around the outer periphery of the casing members 40 and 42, the individual wires being separated somewhat adjacent the shafts 48 and 50, and also in the region of the slot 90. The coil 94 is provided with suitable flexible terminals 94a and 94b, by which it may be connected into the distribution system in the manner described with reference to Fig. 9.

In order to cause the current vector 30 to be variable in space as well as in magnitude, the current projector 26 is provided with a suitable phase displacement element, designated as a whole as 100. The phase displacement element 100 may be constructed in any conventional way, and, as illustrated, comprises a core 102, provided with a magnetizing winding 104, the flexible terminals 104a and 104b of which are arranged to be connected in series with the circuit with which the device is associated. The movable element 106 of the phase displacement element 100 is secured to the shaft 50 so that rotative movements of the former are accompanied by corresponding bodily rotative movements of the casing members 40 and 42. The rotatable member 106 is provided with two voltage coils 108 and 110, wound thereon in ninety degrees spaced relation and so connected into the system, as hereinafter described with reference to Fig. 9, that when the voltage of the single phase circuit with which the device is associated is in phase with the current, the projected current vector 30 coincides in space position with the voltage vector 32. On the other hand, if the current lags ninety degrees behind the voltage, the rotary member 106 takes up a position ninety degrees away from the first mentioned position, moving the current projector 26 in a clockwise direction, as viewed in Fig. 3, to a position in which the current vector 30 is angularly spaced ninety degrees from the voltage vector 32. For intermediate phase relations, the current vector assumes an intermediate position, such as shown in Fig. 1.

Referring particularly to Figs. 7 and 8 the voltage projecting elements 28, comprise a cylindrical enclosure 112, corresponding in general to the enclosure formed by the casing members 40 and 42, which houses a rotatable shield 114. The shield 114 is provided with spaced inwardly projecting legs 116, the inner ends of which are outwardly turned to form trunnions 118, which are rotatably received in bearing box 120 provided therefor in the opposite side walls of the enclosure 112. One of the trunnions 118 projects outwardly of the enclosure 112, and is suitably secured to the rotatable element 122 of a conventional galvonometer element. Stationary member 124 of the galvonometer element is suitably supported upon the base 22 of the casing of the device. A coil spring 126 is connected between the enclosure 112 and the shield 114, so as to urge the shield 114 to a position corresponding to a minimum reading. A stop 128 is preferably positioned within the enclosure 112 to form a positive limit to such movement, the positioning thereof being such that it does not interrupt the voltage beam. A suitable lamp 130 and a reflector 132 associated therewith are carried upon a standard 134 which projects radially into the casing 112, and are disposed to project a beam of light through the slot 136 formed in the periphery of the enclosure 112. The lamps 130, as well as lamps 66, should be arranged to throw beams of light of relatively different intensities so as to produce sharply defined images on the panel 24, and so if the two beams coincide, as at unity power factor, the end of the shorter beam can be clearly seen.

As clearly appears in Figs. 2 and 3, the voltage projecting element 28 is positioned at some little distance from the origin 34 so as to avoid mechanical interference between the current and voltage projecting elements 26 and 28. Accordingly, the slot 136 is so positioned that the original end of the vector 32 coincides with the previously identified origin 34. It is usually found that the systems with which the device may be associated have only a limited voltage variation. In such instances, it is satisfactory to divide the voltage beam into a fixed or uniform portion a—b (Fig. 2) and a variable portion b—c and element 28 is proportioned to respond only to variations of voltage within this variable range.

Referring particularly to Fig. 9, the reference characters L—1 and L—2, designate the two conductors of a suitable single phase system. It will be observed that the coil 122 of the voltage element 28 is shown as connected directly across lines L—1 and L—2. The current coil 94 of the element 26 is connected in series with the system. With this relation it will be observed that the shield associated with the voltage projector 28 takes up a position determined by the magnitude of the voltage between the lines L—1 and L—2, and produces a voltage vector 32 of corresponding length. Increases or decreases in the voltage between the lines L—1 and L—2 result in corresponding angular movement of the voltage shield, correspondingly increasing or decreasing the length of the voltage vector 32 within the variable limits thereof. Similarly, the shield associated with the current element 26 takes up a position determined by the magnitude of the current flowing in the lines L—1 and L—2 and projects a current vector 30 on to the glass panel 24, of corresponding variable length.

The current coil 104 of the displacement element 100 is connected in series with the line L—2, and the voltage coils 108 and 110 are connected across the lines L—1 and L—2. In order to introduce a substantially 90 degrees phase difference between the coils 108 and 110, inductance 140 is shown in the circuit of the coil 108. With this relation, it will be appreciated that the rotatable element 106 takes up a position determined by the phase relation between the voltage across lines L—1 and L—2 and the current flowing in these lines. An in-phase or unity power factor relation between the voltage and the current results in 106 taking up the position in which current vector 30 coincides in space with the voltage vector 32. A 90° lagging relation of the current to the voltage, on the other hand, results in vector 30 taking up a position 90 degrees behind the voltage vector 32. Intermediate phase relations result in intermediate positions of the current vector 30.

The description thus far given has proceeded on the basis that the device is utilized in single phase systems; or in balanced multi-phase systems, in which a measure of the current in one phase, and a measure of the voltage between that phase and an adjacent phase, serves as a measure of current conditions in, and voltage conditions between, the several phases. In accordance with the arrangement shown in Fig. 10, the invention may readily be extended to measure and indicate conditions in a three-phase system in which the loads are unbalanced, but in which the voltages between the several phases are symmetrical. As shown in Fig. 10, three units A, B, and C, respectively, are positioned within a suitable container which may, as will be appreciated, be provided with a graduated glass panel corresponding to the previously described panel 24, and upon the underside of which the several current and voltage vectors may be projected. Each of the units A, B, and C, may and preferably does comprise a voltage element 28 corresponding in all respects to the previously described element 28. Each unit may also comprise a current responsive and phase displacement unit 26 corresponding in all respects to the previously described element 26. The several devices are so positioned within the enclosure that the voltage vectors are equi-angularly spaced from each other, and fall at intermediate points in the panel, so that leading as well as lagging phase relations may be indicated. The origins of the sets of current and voltage sectors are spaced somewhat radially from a common center in order to afford room within the enclosure to accommodate the elements 26.

Illustrative circuit connections for the device of Fig. 10 are shown in Fig. 13, from which it will be noted that the voltage element of unit A is connected to measure the voltages between phases P—1 and P—2, and the current element 26 thereof is connected to measure the current in line P—2 and to measure the phase difference between such current and the just mentioned voltage. These relations are also indicated by the legends in Fig. 10. Similarly, unit B is connected to measure the voltage between phases P—1 and P—3; to measure the current in phase P—1; and to measure the phase angle difference between such current and voltage. The remaining unit C, is connected to measure the current in phase P—3; to measure the voltage between phases P—2 and P—3; and to measure the phase angle difference between these current and voltage values. The individual connections for each of the units A, B, and C, may duplicate the connections previously described with reference to Fig. 9. It will be appreciated that the voltages of the several lines may be measured with reference to ground or to a neutral instead of with reference to an adjacent line, if desired. It also will be appreciated that the units A, B, and C function individually in accordance with the previous description of the device in Figs. 1 through 9, and that the units A, B, and C, collectively, afford a visual and animated measure of the voltage and load conditions in the three phases of the associated circuit.

The present improvements may be also extended for use in unsymmetrical systems, in which the voltages are unsymmetrical and the loads are unbalanced. In doing this, it is preferred to utilize a device as described above with reference to Fig. 10, but modified so that two of the units are bodily movable with respect to the third unit.

The preferred arrangement for providing the foregoing feature is shown diagrammatically in Fig. 11, in which three units A', B', and C' are arranged within a suitable enclosure which may be provided with a glass panel (not shown) as in the previously described instances. Unit B' preferably corresponds in all respects to the unit B of Fig. 10 and includes a current projecting element 26 and a voltage projecting element 28 of the previously described constructions.

It will thus be appreciated that the voltage vector associated with unit B' is fixed in space but variable in magnitude, while the current vector is variable both in space and in magnitude. As shown in Fig. 14, unit B' is connected in the manner previously described with reference to Figs. 9, 10 and 11, to measure the voltage between phases P—4 and P—6, to measure the current in phase P—4, and to measure the phase difference between such current and voltage. This relation is also indicated in the legend in Fig. 11.

The remaining two units A' and C' are connected, as shown in Fig. 14, to measure the respective currents, voltages and phase relations indicated in Figure 11 by the legends. In order to cause the units A' and C' to take up bodily positions which are variable in space in accordance with the phase relations between the unsymmetrical voltages of the system, a structure such as shown in Fig. 12 is preferably provided for each of the units A' and C'.

Referring to Fig. 12 each unit 150 comprises a voltage responsive element 28', a current responsive element 26', and a phase displacement means 100', carried upon a unitary bracket 152. The individual elements 26' and 28' are preferably constructed to cooperate in the manner previously described with reference to elements 26 and 28.

The element 100' may duplicate in construction the previously described element 100, but is illustrated as having a two part stationary iron core structure 164 within which an armature 166 may rotate. As shown in Figure 14, with reference to unit A', the rotatable armature 166 is provided with a pair of coils 166a, 166b, wound in quadrature relation to each other, and the stationary iron core 164 is provided with a coil 164a. A suitable inductance, such as 168, is connected in the circuit of the coils 166b, so as to cause the fluxes in these coils to be substantially 90° lagging with respect to the fluxes in the coils 166a. The connections shown in Figure 14 for the coils 166a, 166b, and 164a are conventional, the former two sets of coils being connected across the lines P4 and P5 and the latter coil being connected in series with the line P5.

It will thus be appreciated that the current projector 26' associated with the unit A' takes up a position in space relative to the voltage projector 28' which is determined by the difference in phase between the current flowing in line P5 and the voltage across lines P4 and P5. The same is true of the current projector associated with the unit C', with respect to its voltage projector 28'.

Bracket 152 is provided with shaft extensions 154 and 156, the pointed ends of which cooperate with jeweled bearings 158 and 160, respectively. The shaft 156 is connected to the rotatable element 162 of a phase displacement element PD, which may be conventionally constructed so as to duplicate in general the functioning of the above described phase displacement element 100'. The connections for the element PD associated with the unit A' are shown in Figure 14, in which the movable coils 170, arranged in quadrature relation to each other, are connected across the lines P4 and P6, a condenser 174 being interposed in the circuit of one pair of coils so as to introduce a substantially 90° phase difference between the fluxes in the respective sets of coils. The stationary coil 172 is connected across the lines P4 and P5. With this relation, it will be appreciated that the rotatable core 162 of the element PD, associated with the unit A', takes up a position which depends upon the phase difference between the voltage across the lines P4 and P5 and the voltage across the lines P4 and P6. The positioning of the movable coils is such that when the just mentioned two voltages are in balanced relation, the armature 162 occupies what may be called a neutral position, in which it supports the bracket 152 in such a position that the voltage vector associated with the unit A' extends at a 120° angle (Figure 11) to the fixed voltage vector associated with the unit B'. If the phase angle between the above mentioned two voltages increases or decreases with respect to the balanced value, the armature 162 rotates in one direction or the other, thereby correspondingly increasing or decreasing the angle (Fig. 11) between the voltage vectors of units A' and B'. The phase displacement element PD associated with the unit C' on the other hand maintains a corresponding relation between the voltage vector associated with the unit C' and the voltage vector associated with the unit B'.

Accordingly, if the system including the lines P4, P5, and P6 is in a symmetrical condition, the three voltage vectors shown in Figure 11 are of equal length and are equally angularly spaced from each other. The angular spacing between these vectors is determined as described immediately above by the action of the phase displacement elements PD associated with the units A' and C', respectively. The magnitude of these voltage vectors, on the other hand, is determined by the voltage projecting elements 28' associated with the individual units A', B', and C'. If the voltages become unsymmetrical, this is reflected as a change in angular spacing as well as a change in magnitude, these changes being controlled by the phase displacement elements PD and the voltage projecting elements 28'.

At the same time, current conditions in the several phases P4, P5, and P6 are indicated and measured by the magnitude and position in space of the current vectors associated with the units A', B', and C'. These current vectors assume a magnitude determined by the associated projectors 26' and assume positions in space relative to their associated voltage vectors as determined by the associated phase displacement elements 100 and 100'.

A further feature of the invention is its ready adaptability for synchronizing purposes. Referring particularly to Fig. 15, two single phase systems having lines L—3 and L—4, and L—5 and L—6, respectively, are shown, which may be connected together by a suitable circuit breaker 180. A vector indicating device 182 is diagrammatically illustrated as comprising vector projecting elements 26" and 28" for projecting vectors V—1 and V—2, respectively. The unit 28" associated with the vector V—1 is provided with a coil 184, shown as connected across the line L—5 and L—6. The vector V—2 is provided with a unit 26", the voltage magnitude coil 186 of which is shown as connected across the lines L—3 and L—4. The unit 26" also includes a phase displacement element designated as a whole as 188, the moving coils of which are shown as connected across the lines L—3 and L—4, and the stationary coil of which is shown as connected across the lines L—5 and L—6. With this relation, it will be appreciated that the magnitudes of the vectors V—1 and V—2 indicate respectively the magnitudes of the voltages between the lines L—5 and L—6, and L—3 and L—4, respectively. Similarly, the angle between the vectors V—1 and V—2 indicates the difference in phase between the just mentioned voltages. Accordingly, a fully synchronized relation of the two single phase systems is indicated when the magnitudes and space positions of the two vectors V—1 and V—2 are identical.

From the foregoing description, it will be appreciated that the present invention provides a simple, compact, readily manufactured, and accurate device for indicating in animated vector form a variety of electrical quantities associated either with single phase or multi-phase systems, of either balanced or unbalanced characteristics, as well as for indicating synchronizing relations between separate and distinct systems. It will be appreciated that various changes in the form, number, and arrangement of parts may be made within the spirit and scope of the invention. The foregoing specific description is, therefore, to be regarded in an illustrative and not in a limiting sense.

What is claimed is:

1. In an electric measuring and indicating device, for association with a circuit, the combination of a first element for projecting a beam of light which extends a variable length from a predetermined origin, a second element for projecting a beam of light which extends a variable distance from said same origin, means responsive to the voltage of said circuit for controlling the length of one of said beams, means responsive to the current in said circuit for controlling the length of the other of said beams, and displacement means responsive to the phase relation between said current and voltage for causing one of said beams to assume an angular position relative to the other of said beams in accordance with said phase relation.

2. In an electric measuring and indicating device, for association with a plurality of circuits, a first element for projecting a beam of light from a predetermined origin, a second element for projecting a second beam of light from said origin, means responsive to an electrical quantity of one of said circuits for controlling the length of one of said beams, means responsive to an electrical quantity of the other of said circuits for controlling the length of the other of said beams, and a displacement element for rotating one of said beams relative to the other about said origin in accordance with the phase relation between said electrical quantities.

3. In an electric indicating and measuring device for association with a plurality of circuits, means responsive to an electrical quantity of one of said circuits for projecting a first beam of light from a common origin, means responsive to an electrical quantity of the other of said circuits for projecting a second beam of light from said origin, and a displacement element for rotating one of said beams relative to the other about said origin in accordance with the phase relation of said quantities.

4. In an electric measuring and indicating device for association with a poly-phase circuit, a plurality of voltage responsive elements for projecting beams of light corresponding to the voltage conditions within the several phases of said circuit, a plurality of current responsive elements for projecting beams of light corresponding to the current conditions of the several phases and means mounting said elements so that each current beam and its associated voltage beam extend from a common origin.

5. In an electric measuring and indicating device for association with a poly-phase circuit, a plurality of voltage responsive elements for projecting beams of light corresponding to the voltage conditions within the several phases of said circuits, a plurality of current responsive elements for projecting beams of light corresponding to the current conditions of the several phases means mounting said elements so that each current beam and its associated voltage beam extend from a common origin, and phase displacement means associated with said device for causing each current beam to assume an angular position relative to its associated voltage beam in accordance with the phase relation between the associated voltage and current, and additional phase displacement means for causing one of said voltage beams to vary in angular position in accordance with the phase relation between the associated voltage and the voltage associated with another beam.

6. In an electric measuring and indicating device, the combination of a casing having a slot in the periphery thereof, means within said casing for projecting a beam of light through said slot, current responsive means for varying the effective length of said slot so as to vary the distance that said beam extends from a predetermined origin, and additional electrically responsive means causing said casing to rotate bodily so as to cause said beam to rotate about said origin.

7. In an electric measuring and indicating device, the combination of a first light beam projecting element for projecting a beam extending from a predetermined origin, a second element for projecting a beam of light extending from said origin, displacement means for causing one of said beams to rotate about said origin relative to the other of said beams, and additional displacement means for causing said beams to rotate in unison about said origin.

8. In an electric measuring and indicating device, the combination of an enclosure having a glass panel graduated with reference to a predetermined origin, an element within said enclosure for projecting a beam of light extending from said origin, a second element within said enclosure for projecting a second beam of light extending from said origin, electrically responsive means individual to said elements for controlling the lengths of said beams, and displacement means associated with one of said elements for causing the associated beam to rotate about said origin.

9. In an electric measuring and indicating device having an enclosure, a glass panel for said enclosure graduated with reference to a predetermined origin, an electrically responsive element for projecting a first beam of light, a second electrically responsive element for projecting a second beam of light, means supporting said first element for bodily rotation about an axis which passes through said origin so that the associated beam originates at said origin, means mounting the other of said elements in laterally displaced relation from said axis and so that the associated beam originates at said origin, and a displacement means associated with said first element for causing said first beam to rotate about said origin.

WILLIAM G. BURKHART.